(12) United States Patent
Nishida

(10) Patent No.: US 7,577,179 B2
(45) Date of Patent: Aug. 18, 2009

(54) LASER IRRADIATION APPARATUS

(75) Inventor: Takeshi Nishida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/853,227

(22) Filed: Sep. 11, 2007

(65) Prior Publication Data

US 2008/0101431 A1    May 1, 2008

(30) Foreign Application Priority Data

Sep. 12, 2006   (JP) .............................. 2006-246511

(51) Int. Cl.
*H01S 3/08* (2006.01)
(52) U.S. Cl. ........................... 372/101; 372/69; 372/70; 372/72; 372/75; 372/92
(58) Field of Classification Search ............... 372/70, 372/68, 72, 75, 92, 98, 101, 107, 108
See application file for complete search history.

(56) References Cited

U.S. PATENT DOCUMENTS

| | | | | |
|---|---|---|---|---|
| 3,588,739 A | * | 6/1971 | Shogo | ........................ 372/72 |
| 3,803,509 A | * | 4/1974 | Steffen | ........................ 372/35 |
| 4,566,107 A | * | 1/1986 | Kitaura et al. | ........... 372/38.06 |
| 4,860,301 A | * | 8/1989 | Nicholson | ...................... 372/68 |
| 5,351,251 A | * | 9/1994 | Hodgson | ........................ 372/4 |
| 5,844,149 A | * | 12/1998 | Akiyoshi et al. | ......... 73/864.81 |

FOREIGN PATENT DOCUMENTS

JP            7-115237            5/1995

OTHER PUBLICATIONS

English language Abstract of JP 7-115237.

* cited by examiner

*Primary Examiner*—Minsun Harvey
*Assistant Examiner*—Yuanda Zhang
(74) *Attorney, Agent, or Firm*—Greenblum & Bernstein, P.L.C.

(57) ABSTRACT

The laser radiation apparatus is provided having substantial light emission intensity although the laser radiation apparatus is miniaturized. A solid state laser rod; the excitation light source formed such that the excitation light source surrounds an emission axis in a section perpendicular with respect to the emission axis of laser light of the solid state laser rod; and a lens barrel placed so that the lens barrel surrounds the excitation light source and condenses light from the excitation light source to the solid state laser rod. Excitation light reflected upon inner surface of the lens barrel is radiated uniformly over the lateral surface of the laser rod so that laser active medium is efficiently excited, and energy conversion rate is improved.

20 Claims, 7 Drawing Sheets

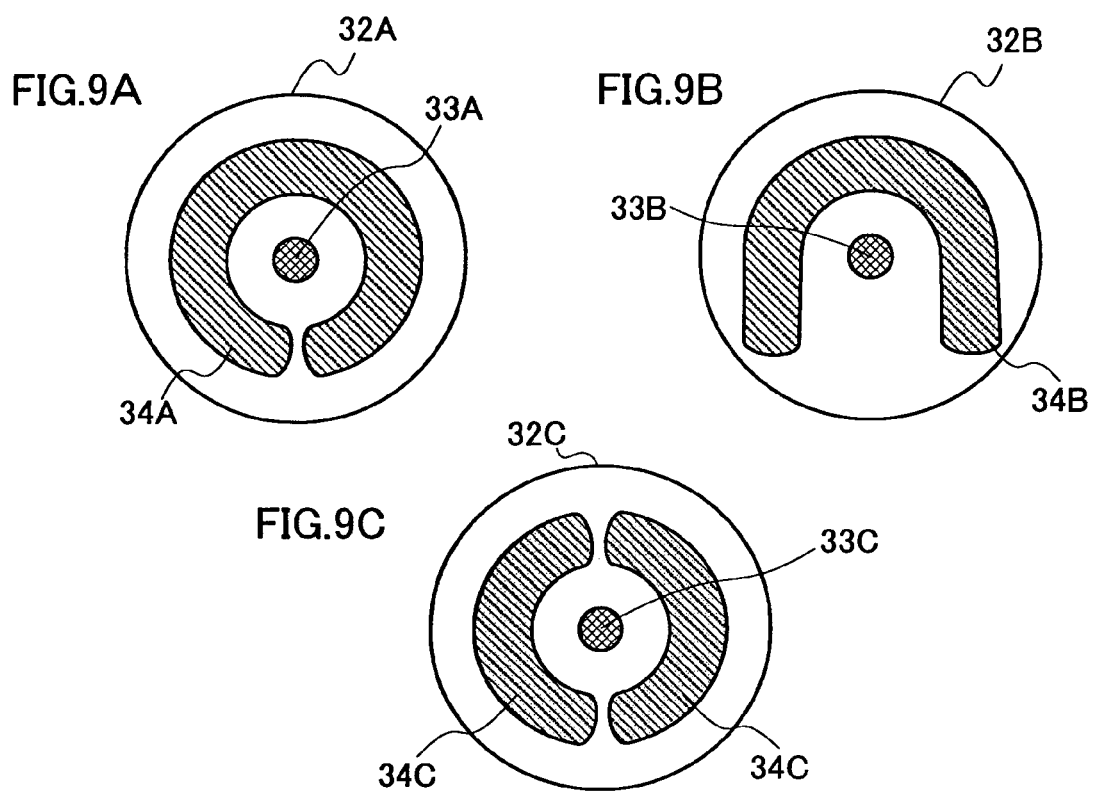
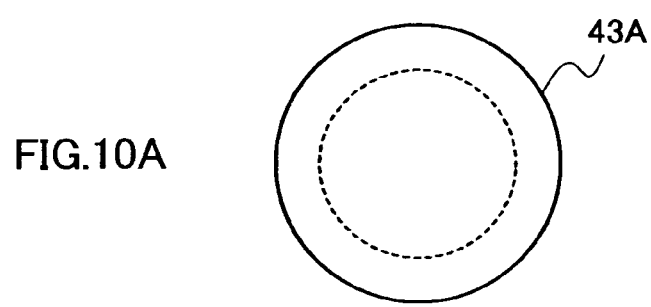
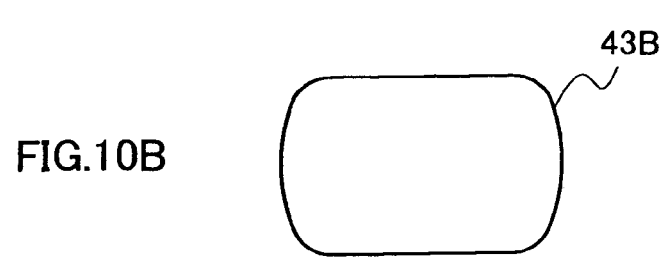

LASER IRRADIATION APPARATUS

CROSS REFERENCE TO RELATED APPLICATIONS

The disclosure of Japanese Patent Application No. 2006-246511, filed on Sep. 12, 2006, including the specification, drawings and abstract, is incorporated herein by reference in its entirety.

BACKGROUND OF THE INVENTION

1. Field of the Invention

The present invention relates to a laser radiation apparatus which can be miniaturized.

2. Description of the Related Art

The use of lasers has broadened quickly in material processing, medicine and measurement areas in recent years. The kinds of these lasers include solid state lasers, gas lasers, fiber lasers and free electron lasers. In addition, laser light oscillation modes include continuous-wave (CW) mode and pulse mode, and any pulse duration and wavelength can be set.

Amongst these lasers, solid state lasers will be described. A solid state laser is an apparatus for producing laser light by radiating excitation light over a solid laser rod provided inside the laser radiation apparatus. The oscillation of laser light using ruby by Maiman marked the beginning of the history of solid state lasers. Moreover, it is well known that a solid state laser in which YAG is the body material of a laser rod, named from the initials of yttrium, aluminum and garnet (see, for example, patent document 1).

FIG. 1 shows a simplified configuration of a conventional solid state laser radiation apparatus. Solid state laser radiation apparatus 1 basically includes a laser rod 2, which oscillates laser light, reflection mirror 3 and reflection mirror 4 for amplifying oscillated laser light, flashlamp 5 for emitting light energy over laser rod 2, power supply 8 for making flashlamp 5 emit light, and lens barrel 6, which covers the whole of flashlamp 5 and reflects and radiates light to laser rod 2.

Instead of reflection mirror 3 and reflection mirror 4, there are cases where a reflection coating is formed at either end face of laser rod 2. Reflection coating (for example, dielectric multilayer coatings) are formed by vapor deposition. By setting the reflectance of reflection mirror 3 at 80 to 95% and the reflectance of reflection mirror 4 at 99.5% or more, which is semi-perfect reflection, laser light amplification becomes possible. Moreover, there are also cases where laser light emitted from laser rod 2 is focused on one point and intensified with condenser lens 7 placed on emission axis of laser rod 2.

Patent Document 1: Japanese Patent Application Laid-Open No. HEI07-115237

The amount of laser light emission is determined by the product of the amount of light emission of the excitation light source including a flashlamp, energy conversion rate, and the volume of the laser rod.

Increasing the end face diameter of the laser rod, that is, making the laser rod thicker, is one method of increasing the amount of laser light emission. However, a thick laser rod is usually expensive. Moreover, the diameter of laser light of a laser radiation apparatus is determined by the diameter of the end face of the laser rod. Consequently, to condense laser light emission, it is necessary to use a lens of a larger diameter than the laser rod. If laser light from a large emitting diameter is used, the length of the diameter of the focus cannot be made smaller than a certain level.

To increase the amount of laser light emission without making the emitting diameter of the laser rod larger, it is necessary to make the length of the laser rod longer, that is, make the laser rod slimmer. However, if a laser rod is made longer, there is a problem that resistance to shock or drop is reduced.

As described above, there is a limit to increase the amount of laser light emission by increasing the volume of the laser rod.

Furthermore, in a conventional laser light emission apparatus, a flashlamp is placed in only one side of the laser rod, which then results in a problem of low energy conversion rate. For example, the ratio (conversion rate) of energy inputted to a xenon flashlamp to the energy produced as laser light, is about 1% or less.

The present invention is implemented in view of the above-described problems, and it is therefore an object of the present invention to provide a laser radiation apparatus that is compact and that enables substantial emission intensity.

SUMMARY OF THE INVENTION

The present invention therefore relates to a laser radiation apparatus comprising a) a solid state laser rod, b) a excitation light source surrounding an emission axis of laser light of the solid state laser rod on a cross sectional plane perpendicular with respect to the emission axis and c) a lens barrel that is placed such that the lens barrel encloses the excitation light source and condenses light from the excitation light source to the solid state laser rod.

In a preferred aspect of the present invention, every cross sectional plane of the lens barrel including the emission axis has a shape of two overlapping ellipses and the two ellipses each have two foci and share one of the two foci with each other. Here, the emission axis of the solid state laser rod and the shared focus meet. Moreover, the excitation light source is placed inside the lens barrel along a path of the other focus.

In another preferred aspect of the present invention, a pipe barrel comprising a condenser lens is provided along the emission axis of an emission side of the solid state laser rod.

In another preferred aspect of the present invention, the excitation light source comprises a flash lamp and the flashlamp that is perpendicular with respect to the emission axis having, A) a ring shape wherein the emission axis include a center of the ring, B) a shape of a letter C or U surrounding the emission axis or C) a shape of two or more arcs surrounding the emission axis.

In another preferred aspect of the present invention, the solid state laser rod has a shape of a pillar and an entire lateral surface of the pillar smoothly curves outwardly or inwardly.

In another preferred aspect of the present invention, the solid state laser rod comprises a YAG single crystal or a YAG ceramic.

According to another preferred aspect of the present invention, A) reflection mirrors are provided forward and backward in the emission direction of the solid state laser rod, B) the end faces of the solid state laser rod are coated with a reflection coating or C) one end face of the solid state laser rod is coated with a reflection coating and a reflection mirror is provided in the other end face of the solid state laser rod.

According to another preferred aspect of the present invention, an inner surface of the lens barrel is formed with a material that reflects excitation light.

The laser radiation apparatus of the present invention have a solid state laser rod in the center, the excitation light source surrounding the solid state laser rod, so that active laser medium doped with the solid state laser rod can be effectively excited with light from the excitation light source. For this reason, the laser radiation apparatus that is compact and that enables substantial emission intensity, can be provided.

BRIEF DESCRIPTION OF THE DRAWINGS

FIG. 9 is a cross sectional view showing the laser radiation apparatus according to Embodiment 3; FIG. 9A shows an arrangement of a C-shaped flashlamp surrounding a laser rod; FIG. 9B shows an arrangement of a U-shaped flashlamp surrounding the laser rod; FIG. 9C shows an arrangement of two arc-shaped flashlamps surrounding the laser rod;

FIG. 10 illustrates a first example of the laser rod in the laser radiation apparatus according to Embodiment 4; FIG. 10A illustrates an end face of the laser rod; FIG. 10B illustrates a lateral surface of the laser rod;

FIG. 11 illustrates another example of the laser rod in the laser radiation apparatus according to Embodiment 4.

DETAILED DESCRIPTION OF THE PREFERRED EMBODIMENT

Figure 1:
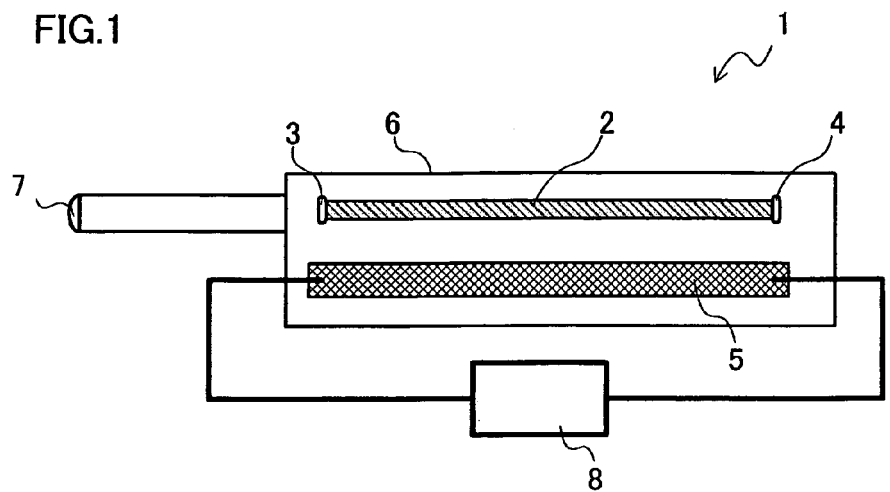
FIG. 1 illustrates a configuration of a conventional laser radiation apparatus.

As described above, the laser radiation apparatus of the present invention includes a) a solid state laser rod, b) a excitation light source, and c) a lens barrel.

Laser Rod

A laser rod is the laser medium (i.e. source of laser oscillation) for a solid state laser. A laser rod refers to a rod-shaped body material doped with rare-earth ions or transition metal ions which serve as an active laser medium. The body material includes various crystals and glass. Examples of doped active laser medium include ions, for example, Erbium (Er), Neodymium (Nd) and Holmium (Ho). Examples of solid state laser mediums include ruby lasers, glass lasers and YAG lasers.

The laser rod for the present invention is preferably a YAG laser rod. The YAG laser rod may use YAG single crystal and YAG ceramics. YAG ceramics refer to polycrystals made of binding YAG crystallites. Furthermore, the laser rod for the laser radiation apparatus of the present invention may use crystals besides YAG (for example, ruby, $Nd:YVO_3$ and $Nd:YLiF_4$ (YLF)).

The shape of the laser rod placed in the laser radiation apparatus of the present invention is normally a pillar shape (cylinder shape in particular), but it is not necessary to be a true cylinder as described later, and the lateral surface of the laser rod may be curved outwardly (see FIG. 10) or curved inwardly (see FIG. 11). In addition, the lateral surface of the rod (i.e., the lateral surface of the cylinder) is preferably made coarse so as not to reflect excitation light.

The dimensions of the laser rod placed in the laser radiation apparatus of the present invention may be defined adequately, when the laser rod is a cylinder, the diameter can be made 2 to 8 mm and the height can be made 5 to 20 mm.

A single crystal laser rod can be produced by bringing a single crystal seed adhered to the tip of a rod into contact with molten material of about 2000 degrees Celsius in a crucible, and thereafter gradually pulling the rod upward and making the seed grow. The pulling takes several months. A ceramic laser rod is sintered as a ceramic by filling a mold with a powder material, applying pressure and forming a shape. The temperature of sintering is around 1750 degrees Celsius in the case of YAG, for example. By properly removing inner bubbles upon sintering, proper laser rod can be produced.

Excitation Light Source

The excitation light source placed in the laser radiation apparatus of the present invention is placed around the solid state laser rod. More preferably, the excitation light source is placed along the emission axis of laser light of the solid state laser rod so as to encircle the emission axis in the center. Consequently, in the cross sectional plane perpendicular to the emission axis of the solid state laser rod, the excitation light source is placed so as to surround the emission axis (preferably, surrounding the emission axis in the center).

Patterns of surrounding the emission axis include surrounding the emission axis with a ring-shape (see FIGS. 3 and 6), surrounding the emission axis in a shape of the letter C or the letter U (see FIGS. 9A and 9B) and surrounding the emission axis with two or more arc-shaped excitation light sources (see FIG. 9C).

By surrounding a solid state laser rod by the excitation light source, excitation light is uniformly radiated to the entire solid state laser rod, so that excitation rate of the solid state laser rod can be improved.

The excitation light source may be a flashlamp or any member that can emit light to make the solid state laser rod excitation. The diameter of the lamp tube of the flash lamp is preferably 2 to 8 mm. The curvature of the lamp is preferably about 4 to 22 mm (The curvature radius is about 2 to 10 mm) with respect to the laser rod in the center.

This flashlamp can be produced by sealing inert gas including xenon or krypton in a glass tube, preparing electrode at the both ends and providing a spark coil inside. Particularly, a flashlamp with a sealing gas of xenon can produce high luminance.

Lens Barrel

The lens barrel placed in the laser radiation apparatus of the present invention encloses the excitation light source. The inner surface of the lens barrel reflects light from the excitation light source. The light reflected by the inner surface of the lens barrel is condensed to the laser rod.

To condense the light reflected by the inner surface of the lens barrel to the laser rod, for example, the lens barrel has an elliptical shape rotated 360 degrees (see FIG. 4) and the laser rod may be placed in the center of the ellipse (the intersection of the major axis and minor axis). By this means, the light reflected upon the inner surface of the lens barrel is radiated uniformly over the lateral surface of the rod.

Moreover, to condense the light reflected by the inner surface of the lens barrel to the laser rod, the cross sectional plane of the lens barrel passing the emission axis of the laser rod is made a shape of two overlapping ellipses. The two overlapping ellipses each have two foci and share one focus with each other. Then, the laser rod is placed so that the emission axis passes through the shared focus and the excitation light source is placed along the path of the other focus (unshared focus) (see FIG. 7). The shared focus and the other focus of the two ellipses (unshared focus) are preferably arranged linearly. Moreover, the two overlapping ellipses are preferably the same shape.

Certainly, the shape of the lens barrel is particularly not limited as long as light from the excitation light source is reflected and condensed by the inner surface of the lens barrel and radiated upon the laser rod.

The inner surface of the lens barrel is only necessary to reflect the excitation light, and its inner surface may be aluminum coated with silver, high-luminance aluminum and glass coated with silver.

Reflection Mirror or Reflection Coating

The laser radiation apparatus of the present invention is preferably provided with reflection mirrors forward and backward of the solid state laser rod along the emission axis so that the oscillated laser light can be amplified in the solid state laser rod. By placing semi-perfect mirror which have a reflectance of 99.5% or more backward in the emission direction and by placing the reflection mirror which have a reflectance of 80 to 95% forward in the emission direction, the amplified laser light passes through the reflection mirror forward in the emission direction. The semi-perfect mirror where the reflectance is 99.5% or more is, for example, a mirror coating of aluminum with a protective coating or a low absorbance dielectric multilayer coating. On the other hand, the reflection mirror where the reflectance is 80 to 95% is, for example, a low absorbance dielectric multilayer coating.

In the laser radiation apparatus of the present invention, instead of reflection mirrors provided forward and backward of the solid state laser rod, the end faces of the solid state laser rod forward and backward of the laser emission direction may be coated by a film serving as a reflection mirror. The film serving as a reflection mirror (or "reflection coating") is, for example, a dielectric multilayer with reduced light absorption. Only one of forward and backward end faces of the solid state laser rod can be coated with a reflection coating, or both end faces may be coated with reflection coatings.

Condenser Lens

The laser radiation apparatus of the present invention preferably has a condenser lens to condense laser light emitted from the solid state laser rod to a predetermined position. The condenser lens may be made of sapphire glass, borosilicate glass and fluoride including calcium fluoride as long as the condenser lens can condense the emitted laser without degradation.

The condenser lens is placed inside a pipe barrel. The pipe barrel may be placed along the emission axis and communicates with the lens barrel. The size of the pipe barrel is not particularly limited, but the interior diameter can be made 5 to 12 mm and the length can be made 5 to 20 mm, and greater diameter and length may be available. The inner surface of the pipe barrel, similar to the inner surface of the lens barrel, is preferably coated so as to reflect light.

Use of the Laser Radiation Apparatus

The laser radiation apparatus of the present invention is applicable for any use including metal processing as in conventional cases. In such cases, continuous laser radiation is required, and so thermal lens effect may be caused due to heating. The thermal lens effect refers to the phenomenon that the refracting rate of the laser rod varies depending on temperature and causes laser light to refract and beam quality to degrade. This is caused when laser light is oscillated, the temperature in the center of the crystals forming a rod is raised, the refracting rate of the center of the rod increases and the refracting rate of the periphery of the rod decreases, and as a result, the rod works like a lens and broadens laser light. To reduce the thermal lens effect, fans or other cooling members are preferably provided.

On the other hand, the laser radiation apparatus of the present invention may be used for radiating laser beam with human body (particularly, fingertips), forming a puncture by ablation and obtaining blood for examination use. For example, the laser radiation apparatus can be used as a puncture member of a blood test device. In that case, it is only necessary to radiate a single pulse or several pulses, and so it is basically unnecessary to cool the device. However, when several pulses are radiated, the apparatus may be cooled a little to maintain the performance.

Additionally, the laser radiation apparatus for making a human body bleed do not require as much power as for metal processing, so that the laser beam is radiated effectively with small applied voltage.

When the laser radiation apparatus of the present invention is used to puncture skin, a compact size (for example, the size of 15 mm square and a length of 50 mm or less) is preferable. Moreover, when the excitation light source is a flashlamp, the input voltage is preferably 200 to 500 V and the capacity of the charge capacitor is 200 to 900 µF (more preferably, the input voltage is 200 to 300V, the capacity of the charge capacitor is 200 to 300 µF), and the output is preferably 30 to 120 mJ.

The focal length of the condenser lens is preferably 10 to 25 mm, and more preferably, 15 to 20 mm. Moreover, upon skin ablation, the lens on the optical path of laser light may be contaminated by the ablation, so that it is preferable to provide a lens cover transparent to laser light. The lens cover transparent to laser light is made of, for example, glass of 0.1 to 1.0 mm thick or fluoroplastic such as Teflon (registered trademark).

The laser radiation apparatus of the present invention will be described below in detail with reference to the accompanying drawings. The following examples of embodiments in the present invention do not limit the scope of the present invention.

Embodiment 1

Figure 2:
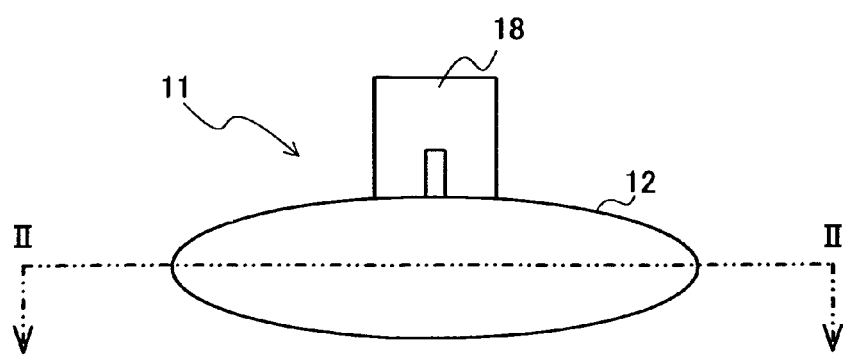
FIG. 2 is a side view of a laser radiation apparatus according to Embodiment 1.
Figure 3:
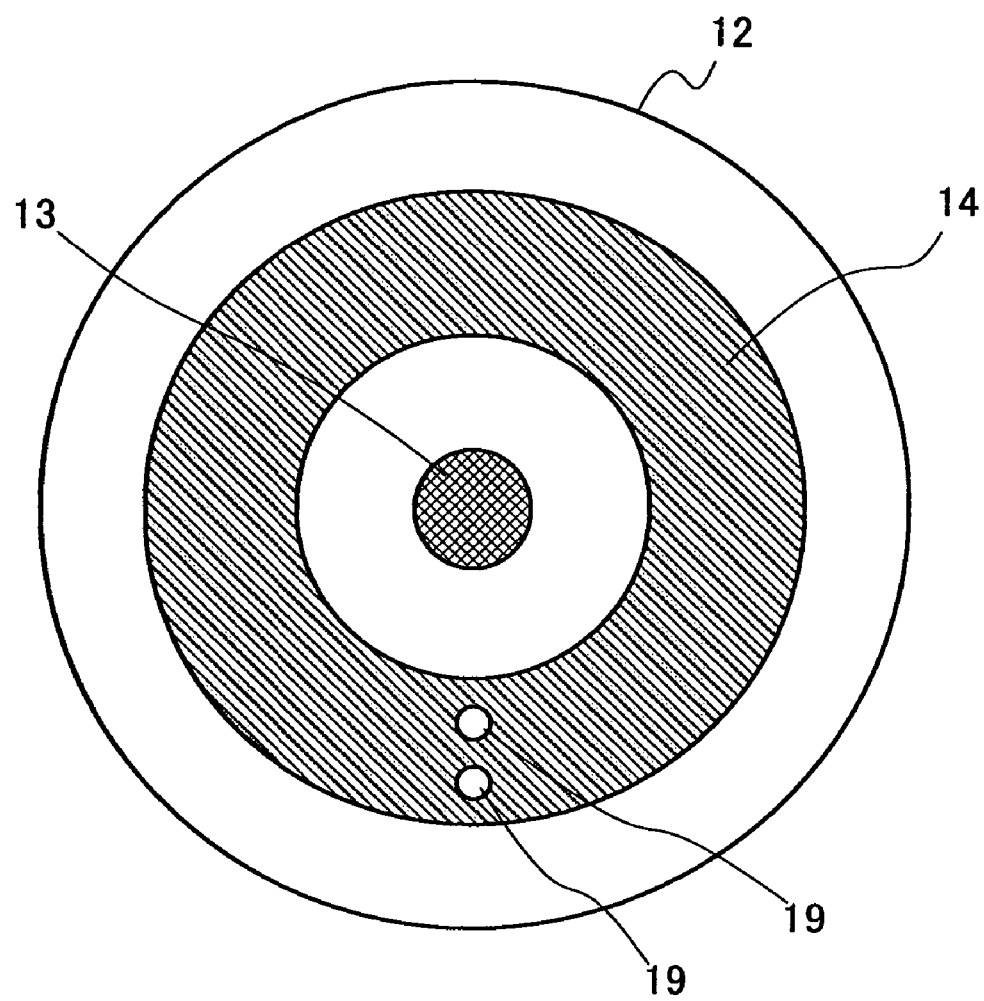
FIG. 3 is a cross sectional view showing the laser radiation apparatus according to Embodiment 1.
Figure 4:
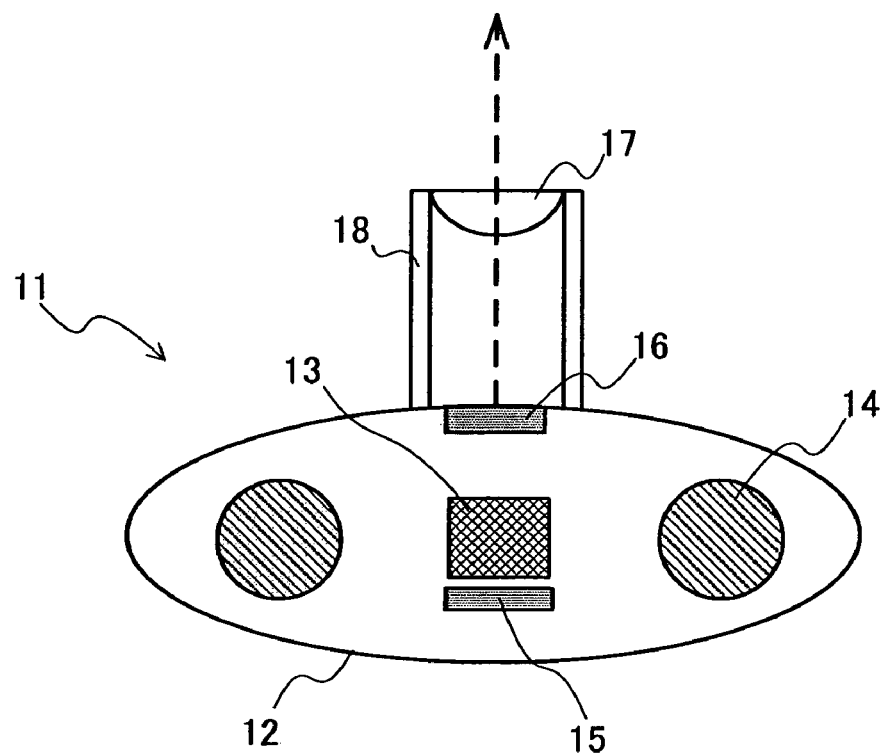
FIG. 4 is a longitudinal view of the laser radiation apparatus according to Embodiment 1.

FIGS. 2 to 4 show laser radiation apparatus 1 of Embodiment 1. FIG. 2 is a side view of a laser radiation apparatus 11 of Embodiment 1; FIG. 3 is a cross sectional view taken along the line II-II of lens barrel 12 of FIG. 2; and FIG. 4 is a longitudinal sectional view for showing an inner construction of FIG. 2 (a cross sectional plane including the emission axis of the laser rod).

As shown in FIG. 2, lens barrel 12 of laser radiation apparatus 11 has a flat spherical shape; as shown in FIG. 3, a cross sectional plane of lens barrel 12 has a circle shape; as shown in FIG. 4, a longitudinal sectional plane of lens barrel 12 has an elliptical shape.

As shown in FIG. 2, pipe barrel 18 is placed on lens barrel 12. As described below, pipe barrel 18 is formed along the emission axis of laser rod 13 (see FIG. 3) and condenser lens 17 (see FIG. 4) is placed at the top inside the pipe barrel.

As shown in FIG. 3, laser rod 13 is placed in the center of the cross sectional plane of lens barrel 12. That is, laser rod 13 is placed such that the emission axis is perpendicular with respect to the cross sectional plane of lens barrel 12. Moreover, as shown in FIG. 3, flashlamp 14 is placed so as to enclose laser rod 13. Namely, flashlamp 14 surrounds the emission axis along the emission axis of laser rod 13.

Laser rod 13 of laser radiation apparatus 11 is a YAG laser doped with Erbium (Er:YAG) (More specifically, laser rod 13 is 50% erbium-doped Er:YAG). However, as described before, laser rod 13 may be a solid state YAG crystal doped with, for example, Erbium (Er), Neodymium (Nd) and Holmium (Ho), or may also be other laser rods. Laser rod 13 has a cylinder shape but may employ other shapes. The lateral surface of the cylinder is made coarse so as not to reflect the excitation light. Laser rod 13 is a cylinder of a 6 mm diameter and a 10 mm length, but any size may be set as described before. Reference numeral 19 shown in FIG. 3 is power connector for the laser rod.

Lens barrel 12 of laser radiation apparatus 11 has a shape of the ellipse shown in FIG. 4 rotated 360 degrees around the emission axis placed in the center. Consequently, the excitation light produced from flashlamp 14, which is the excitation light source, is radiated uniformly over the lateral surface of laser rod 13. The inner surface of lens barrel 12 is a reflection mirror and this reflection mirror may be aluminum coated with silver, high-luminance aluminum and glass coated with silver. Naturally, the shape of lens barrel 12 of laser radiation apparatus 11 is not limited to the shapes shown in the figures and may also be a circle or other shapes having curvature, as long as the light emitted from flashlamp 14 is reflected, condensed and radiated to laser rod 13 by the inner surface of lens barrel 12.

Flashlamp 14 refers to the flashlamp which xenon gas is sealed inside the lamp tube. The interior diameter of the lamp tube of flashlamp 14 is 2 to 8 mm. Flashlamp 14 has a ring-shape with an interior diameter of 4 to 20 mm and is placed such that laser rod 13 is placed in the center. When a voltage of about 5 to 10 kV as a trigger voltage is instantly applied to flashlamp 14, the voltage of the spark coil increases, and the sealed xenon gas is ionized. Then, after a voltage of about 700 V is applied, electricity flows and the xenon gas is discharged and light is emitted.

As shown in FIG. 4, reflection mirror 15 is placed at one end face of laser rod 13 and lens barrel 16 is placed at the other end face of laser rod 13 of laser radiation apparatus 11. The reflectance of reflection mirror 15 is approximately 100% and the reflectance of reflection mirror 16 is 90%. Reflection mirror 15 is a mirror coating of aluminum with a protective coating, or low absorbance dielectric coating (for example, $SiO_2$). Reflection mirror 16 is a dielectric multilayer coating. As a result, the oscillated laser light is amplified in laser rod 13 by reflection mirror 15 and reflection mirror 16 (output mirrors), the amplified laser light passes through reflection mirror 16 and laser light is outputted.

As described above, laser radiation apparatus 11 has pipe barrel 18 attached to the upper part of lens barrel 12 (FIGS. 2 and 4). As shown in FIG. 4, condenser lens 17 is placed at the top inside pipe barrel 18 (i.e. the farthest part from the lens barrel). The laser light amplified by stimulated emission passes reflection mirror 16 and is condensed to a predetermined position by condenser lens 17. Materials of condenser lens 17 are as described above. The size of the pipe barrel, for example, is as described above and the inner surface of the pipe barrel is applied with the same coating as the inner surface of lens barrel 12.

The operations of laser radiation apparatus 11 in Embodiment 1 will be described below. The excitation light emitted from flashlamp 14 goes inside laser rod 13, and excites the doped laser activation material (Erbium (Er) is example), to produce light. The produced light is reflected between reflection mirror 15, laser rod 13 and reflection mirror 16 then the light resonates and is amplified. The laser light amplified by stimulated emission partially passes reflection mirror 16. The laser light passed through reflection mirror 16 goes through condenser lens 17 and is emitted.

Specific examples will be described. The illustration of the circuit section for driving the present apparatus is omitted. A trigger voltage of 7 to 9 kV is applied between the conductive layer attached to the tube face of flashlamp 14 and cathode (i.e., negative electrode) inside the lamp tube of flashlamp 14 and at the same time a voltage of 200 to 700 V is applied between electrodes in the flashlamp to make the flashlamp emit. By setting voltage applying time 200 μsec to 2 msec between electrodes in the flashlamp, the flashlamp emits pulse radiation. Laser rod 13 of laser radiation apparatus 11 in Embodiment 1 is 50% Er-doped Er:YAG, so that the emitted excitation light enters laser rod 13. By this means, the light emitted when the excited Er molecules resume stable state, is amplified by stimulated emission between reflection mirror 15 and reflection mirror 16, passes through reflection mirror 16 and is emitted in the direction of the arrow in FIG. 4. As a result, laser light of 2.94 μm wavelength is emitted from laser radiation apparatus 11 of Embodiment 1. The emitted laser light can be condensed to the position 25 mm away from the top of pipe barrel 18, by lens 17 with 25 mm focus length.

Embodiment 2

Figure 5:
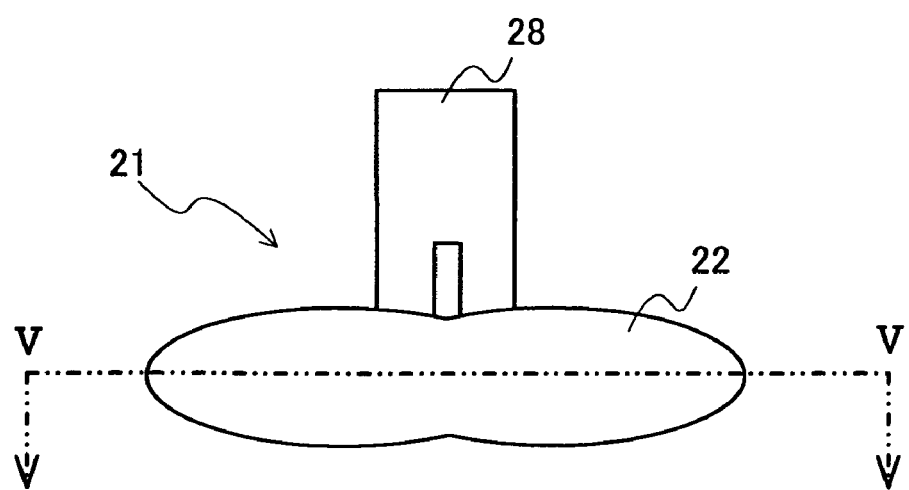
FIG. 5 is a side view of the laser radiation apparatus according to Embodiment 2.
Figure 6:
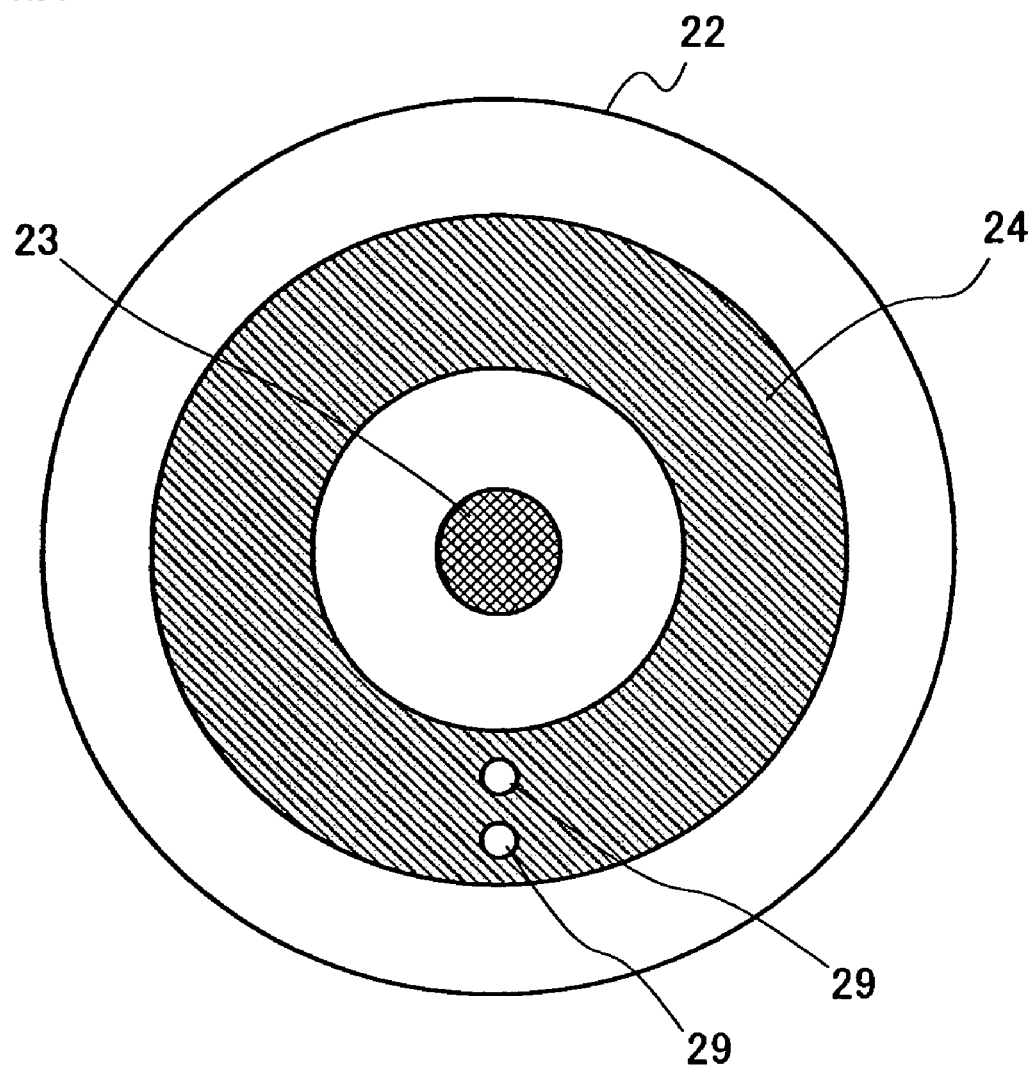
FIG. 6 is a cross-sectional view showing the laser radiation apparatus according to Embodiment 2.
Figure 7:
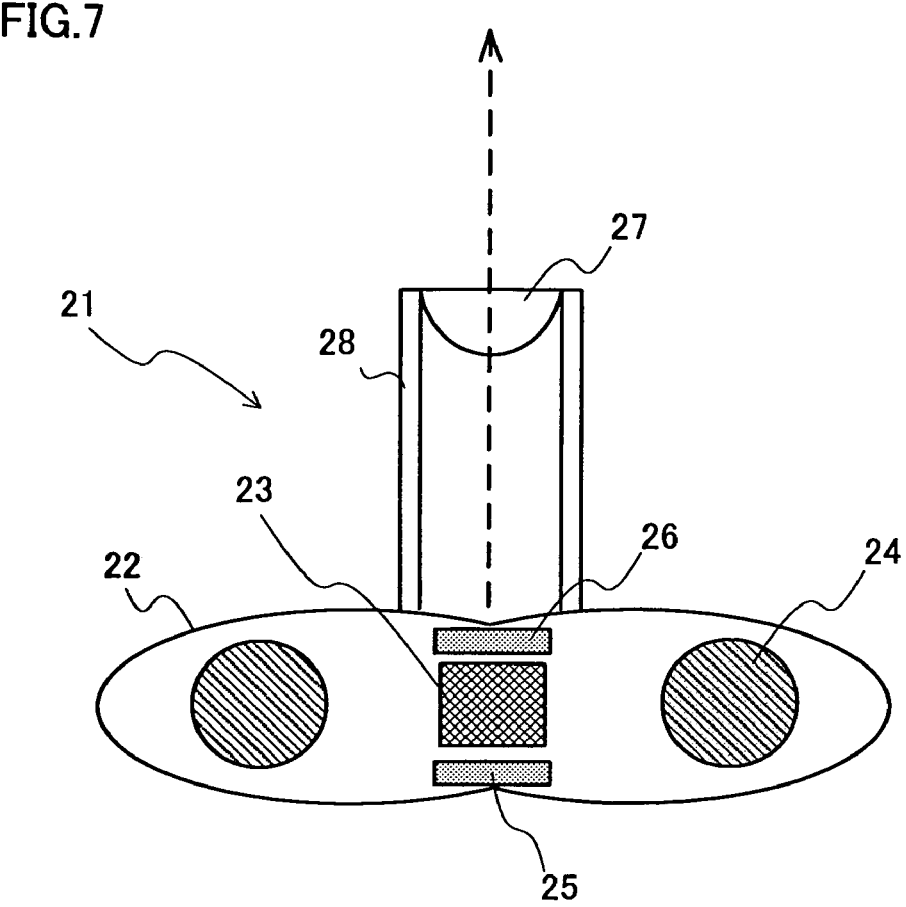
FIG. 7 is a longitudinal view showing the laser radiation apparatus according to Embodiment 2.
Figure 8:
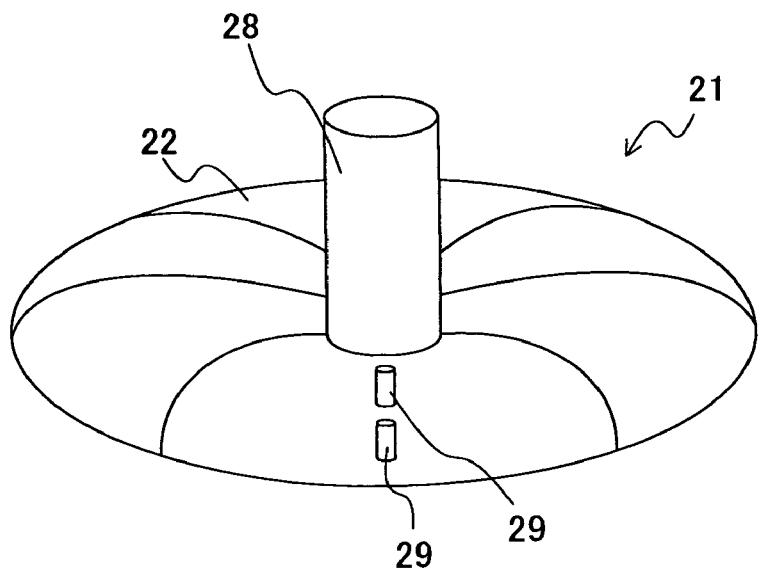
FIG. 8 is an outline perspective view showing the laser radiation apparatus according to Embodiment 2.

FIGS. 5 to 8 shows laser radiation apparatus 21 of Embodiment 2. With laser radiation apparatus 21, the shape of the lens barrel differs from laser radiation apparatus 11 of Embodiment 1. Laser radiation apparatus 21 will be described below mainly about the different components. FIG. 5 is a side view of laser radiation apparatus 21, FIG. 6 is a cross sectional view taken along the line V-V of lens barrel 22, FIG. 7 is a longitudinal sectional view to describe inner components of laser radiation apparatus 21 (i.e., a longitudinal sectional plane including the emission axis of the laser rod), and FIG. 8 is an outline perspective view of laser radiation apparatus 21.

As shown in FIG. 7, the longitudinal sectional plane of lens barrel 22 of laser radiation apparatus 21 has a shape of two overlapping ellipses. Here, an ellipse has two foci and the two ellipses are overlapped so as to share one of the two foci with each other. Lens barrel 22 of laser radiation apparatus 21 has a shape of two overlapping ellipses (FIG. 7) rotated 360 degrees around the emission axis of laser rod 23 in the center. FIG. 8 shows an outline perspective view of laser radiation apparatus 21 from the side of pipe barrel 28. As shown in FIG. 8, lens barrel 22 has a flat spherical shape in which the part meeting the emission axis of laser rod 23 is recessed. Reference numeral 29 in FIGS. 6 and 8 is a power connector for the flashlamp.

As shown in FIG. 7, inside lens barrel 22, laser rod 23 is placed at the shared focus and flashlamp 24 is placed at a position on the path of the other focus. It is conceivable that the light emission from flashlamp 24 is directly radiated to laser rod 23; and the light is reflected and radiated to laser rod 23 by inner surface of lens barrel 22. When the light emission from flashlamp 24 placed as shown in FIG. 7, is reflected by the inner surface of lens barrel 22, the light emission is focused on laser rod 23 at the shared focus. By this means, excitation light of flashlamp 24 can effectively excite the active laser medium in laser rod 23. Moreover, compared to conventional apparatuses, light from flashlamp 24 is radiated uniformly over the entire lateral surface of laser rod 23, so that the excitation rate of laser rod 23 is improved, and, as a result, excitation variance in the entire rod can be reduced.

Embodiment 3

The laser radiation apparatus of Embodiment 3 will be described. With Embodiment 3 of the laser radiation apparatus, the shape of flashlamp differs from the laser radiation apparatuses 11 and 21 of Embodiments 1 and 2. FIG. 9 is a cross sectional view of the lens barrel of the laser radiation apparatus equivalent to FIG. 3 in Embodiment 1 and FIG. 6 in Embodiment 2. The C-shaped flashlamp in FIG. 9A; U-shaped flashlamp in FIG. 9B; and two arc-shaped flashlamps in FIG. 9C, are placed so as to surround laser rods 33A to 33C.

The flashlamps used in Embodiments 1 and 2 have a ring-shape, on the other hand the flashlamps shown in FIGS. 9A to 9C (34A to 34C) are curved but have shapes of open circles. With these flashlamps (34A to 34C), connectors to provide power are easily provided at both end faces of the flashlamps and the flashlamps can be produced easily at low cost. In particular, flashlamps shown in FIG. 9B and FIG. 9C (34B and 34C) should not be inserted to the cross sectional plane at right angles, but flashlamps can be inserted to the cross sectional plane at angles inside lens barrels (32B and 32C) where the laser rod is placed, so that it is easy to insert the flashlamps to improve easy assembly. Moreover, flashlamps 34C shown in FIG. 9C can be inserted so as to sandwich laser rod 33C placed inside lens barrel 32C, so that positioning accuracy is improved.

The flashlamps are produced by making a glass tube of a certain shape and by sealing inert gas into the glass tube. In addition, the flashlamps may have a ring shape or a spiral shape. Furthermore, in this case, it should be noted that the connector for applying voltage to the flashlamp is not in contact with the laser rod.

Embodiment 4

Figure 11A:
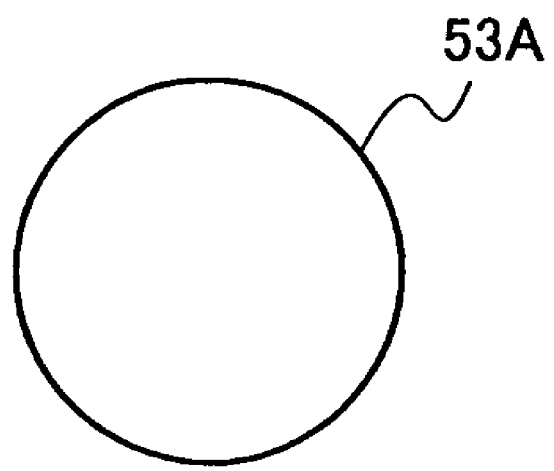
FIG. 11A illustrates an end face of the laser rod.
Figure 11B:
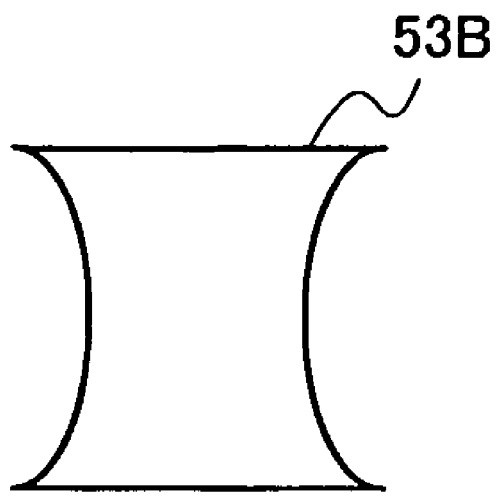
FIG. 11B illustrates a lateral surface of the laser rod.

Next, the laser radiation apparatus of Embodiment 4 will be described. With the laser radiation apparatus of Embodiment 4, the shape of the laser rod differs from laser radiation apparatuses 11 and 21 of Embodiments 1 and 2. FIGS. 10 and 11 show examples of the laser rod in the laser radiation apparatus according to Embodiment 4. The laser rod shown in FIG. 10 has a cylinder shape, where the lateral surface is curved outward. FIG. 10A shows the end face of rod 43A and FIG. 10B shows the lateral surface of rod 43B. Meanwhile, the laser rod shown in FIG. 11 has also a cylinder shape but its lateral surface is curved inward. FIG. 11A shows the end face of rod 53A and FIG. 11B shows the lateral surface of rod 53B. The entire lateral surface of the rod is preferably smoothly curved outwardly or inwardly.

As shown in FIGS. 10 and 11, by making the lateral surface of the rod curve outward or inward, excitation light from the excitation light source easily enters inside the laser rod. Consequently, excitation rate can be improved compared with the laser rods in Embodiments 1 and 2 (where the lateral surface is flat).

The diameter and the length of the laser rod may be specified as the sizes described in the above embodiments. The outward curve or the inward curve of the lateral surface of the rod may be produced, for example, by cutting the lateral surface of the rod after a cylinder rod is produced. With regards to the extent of outward curve, the round diameter of the side sectional plane of the most outward portion of the cylinder rod lateral surface is preferably 5 to 25% greater than the round diameter of the end face. Similarly, with regards to the extent of inward curve, the round diameter of the side sectional plane of the most inward portion of the cylinder rod lateral surface is preferably 5 to 25% smaller than the round diameter of the end face.

INDUSTRIAL APPLICABILITY

The radiation apparatus of the present invention can miniaturize and enables excellent output of has high conversion rate, so that substantial output can be produced. Particularly, the laser radiation apparatus of the present invention is applicable to apparatuses that do not require high-power laser output (for example, apparatus for use in the medical field).

What is claimed is:

1. A laser radiation apparatus comprising:
   a solid state laser rod;
   an excitation light source surrounding an emission axis of laser light of the solid state laser rod on a cross sectional plane perpendicular with respect to the emission axis; and
   a lens barrel that is positioned such that the lens barrel encloses the excitation light source and condenses light from the excitation light source to the solid state laser rod, the lens barrel having an ellipsoid shape, a minor axis of the ellipsoid coinciding with the emission axis of the laser light.

2. A laser radiation apparatus comprising:
   a solid state laser rod;
   an excitation light source surrounding an emission axis of laser light of the solid state laser rod on a cross sectional plane perpendicular with respect to the emission axis; and
   a lens barrel that is positioned such that the lens barrel encloses the excitation light source and condenses light from the excitation light source to the solid state laser rod, every cross sectional plane of the lens barrel including the emission axis has a shape of two overlapping ellipses and the two ellipses each have two foci and share one of the two foci with each other;
   the emission axis of the solid state laser rod and the shared focus meet; and
   the excitation light source is positioned inside the lens barrel along a path of the other focus.

3. The laser radiation apparatus according to claim 1, wherein a pipe barrel comprising a condenser lens is provided along the emission axis of an emission side of the solid state laser rod.

4. The laser radiation apparatus according to claim 1, wherein:
   the excitation light source comprises a flashlamp; and
   a cross section of the flashlamp perpendicular with respect to the emission axis has a ring shape, the emission axis including a center of the ring.

5. The laser radiation apparatus according to claim 1, wherein:
   the excitation light source comprises a flashlamp; and
   a cross section of the flashlamp perpendicular with respect to the emission axis has a shape of a letter C or U surrounding the emission axis.

6. The laser radiation apparatus according to claim 1, wherein:
   the excitation light source comprises two or more flashlamps; and
   a cross section of the flashlamp perpendicular with respect to the emission axis has a shape of two or more arcs surrounding the emission axis.

7. The laser radiation apparatus according to claim 1, wherein the solid state laser rod has a shape of a column and an entire lateral surface of the column smoothly curves outwardly or inwardly.

8. The laser radiation apparatus according to claim 1, wherein the solid state laser rod comprises a YAG single crystal.

9. The laser radiation apparatus according to claim 1, wherein the solid state laser rod comprises a YAG ceramic.

10. The laser radiation apparatus according to claim 1, wherein reflection mirrors are provided at a front end and at a back end along the emission axis of the solid state laser rod.

11. The laser radiation apparatus according to claim 1, wherein end faces of the solid state laser rod are coated with a reflection coating.

12. The laser radiation apparatus according to claim 1, wherein one end face of the solid state laser rod is coated with a reflection coating and a reflection mirror is provided at the other end face of the solid state laser rod.

13. The laser radiation apparatus according to claim 1, wherein an inner surface of the lens barrel comprises a material that reflects excitation light.

14. The laser radiation apparatus according to claim 1, wherein a length of the solid state laser rod is in a range of from 5 to 20 mm, and a diameter of the solid state laser rod in a range of from 2 to 8 mm.

15. An apparatus for puncturing skin including the laser radiation apparatus according to claim 1, and further comprising a pipe barrel having a condenser lens, positioned along the emission axis of the solid state laser rod at an emission side of the solid state laser rod.

16. The laser radiation apparatus according to claim 2, wherein a length of the solid state laser rod is in a range of from 5 to 20 mm, and a diameter of the solid state laser rod in a range of from 2 to 8 mm.

17. An apparatus for puncturing skin including the laser radiation apparatus according to claim 2, and further comprising a pipe barrel having a condenser lens, positioned along the emission axis of the solid state laser rod at an emission side of the solid state laser rod.

18. The laser radiation apparatus according to claim 2, wherein a pipe barrel comprising a condenser lens is provided along the emission axis of an emission side of the solid state laser rod.

19. The laser radiation apparatus according to claim 2, wherein:
    the excitation light source comprises a flashlamp; and
    a cross section of the flashlamp perpendicular with respect to the emission axis has a ring shape, the emission axis including a center of the ring.

20. The laser radiation apparatus according to claim 2, wherein:
    the excitation light source comprises a flashlamp; and
    a cross section of the flashlamp perpendicular with respect to the emission axis has a shape of a letter C or U surrounding the emission axis.

* * * * *